UNITED STATES PATENT OFFICE.

ALEXANDER DANIEL ELBERS, OF HOBOKEN, NEW JERSEY.

PROCESS OF TREATING BLAST-FURNACE SLAG FOR CEMENT.

SPECIFICATION forming part of Letters Patent No. 617,241, dated January 3, 1899.

Application filed July 13, 1898. Serial No. 685,853. (No specimens.)

*To all whom it may concern:*

Be it known that I, ALEXANDER DANIEL ELBERS, of Hoboken, in the county of Hudson and State of New Jersey, have invented a new and Improved Process of Treating Blast-Furnace Slag for Cement, of which the following is a full, clear, and exact description.

The invention has for its object to adapt slag that is suitable for my treatment for use as a silicifying ingredient for admixture to hydraulic cement, such as Portland and Rosendale, and for similar purposes.

The invention consists in superficially desulfurizing pulverized blast-furnace slag by the application of a weak solution of nitric acid and in alkalizing the superficially-desulfurized slag by impregnating it with an alkaline solution and by preference with an aqueous solution of sodium carbonate, all as hereinafter more fully described, and pointed out in the claims.

For admixture to hydraulic cement blast-furnace slag is chiefly useful as a silicifying ingredient, and slag of the singulo-silicate type (oxygen ratio of about one to one) is the most suitable in that respect, because it readily yields gelatinous silica to the lime that dissolves out of the gaged cement; but in its crude state such slag is objectionable as an admixture because it carries a rather large percentage of soluble and easily-decomposable sulfids which are also reacted upon by the lime of the cement. In dissolving, these impurities become intermixed with the newly-forming cementitious compounds, on the gradual induration of which the ultimate strength of the mass depends, and in being thus rendered sulfurous these compounds are liable to subsequent disintegration, which sometimes only sets in after the lapse of years. The crude slag can, however, be rendered perfectly harmless in this respect by superficially desulfurizing it in its pulverized state by the application of a weak solution of nitric acid. By this treatment, which is fully described in United States Letters Patent No. 579,820, issued to me March 30, 1897, the objectionable impurities are so deeply eradicated from the surfaces of the slag particles that the remaining contents cannot become exposed to the reactions that take place in applied cement. Besides, the treatment has a favorable effect on the ferruginous constituents of the slag particles and promotes the formation of gelatinous silica. Though the slag that has been thus treated is more energetic than the crude as regards its silicifying action, the latter develops, nevertheless, so slowly that the admixture of such slag does not increase but rather lowers the initial strength of a cement, meaning thereby the resistance to tension and compression which it can acquire within from one to seven days after setting. Aside from technical considerations this is also a drawback from a commercial point of view, inasmuch as a cement that does not exhibit great strength at short-time tests is not as merchantable as one that does. This shortcoming can be remedied by alkalizing the slag after it has been superficially desulfurized. It is, however, not advisable to dry-mix the alkalies, because the quantity that can be admixed without causing injurious results is so small that it cannot be evenly distributed throughout the mass in a practical manner, the result being that the slag that is dry-mixed with alkalies is apt to contain a good deal of them in some spots and very little in others and that its working is consequently apt to be irregular and unreliable. Moreover, the most suitable alkaline admixture—namely, commercial soda—does not dissolve so readily in cold water as to become thoroughly diffused during gaging when it has been admixed in the dry state, whereas the thin films that deposit on the slag particles when they are impregnated with an alkaline solution dissolve quickly and react evenly on all of the mass.

I now proceed to describe how the process can be carried out. As regards the superficial desulfurization of the pulverized slag I prefer to follow the treatment described in the United States Letters Patent before referred to. I do not, however, find it necessary to pulverize the slag for that purpose any finer than to make it pass through a sieve of ninety meshes to the linear inch. If the superficially-desulfurized slag is to be alkalized in its dried or finished state, I mix it with about one-fifth part, by weight, of a two-and-a-half per cent. aqueous solution of sodium carbonate ($Na_2CO_3$) or with just enough to moisten the mass thoroughly, which is best done by charging a measured quantity of the slag into tanks or vats that contain a corresponding portion of the solution and by turning the soaking mass over until all of it has become impregnated with the solution. The impregnated mass may then be allowed to dry in the vats, or it may be taken to a drying-room and subjected to a moderate heat, such as can be provided by radiation from steam-pipes. The dried mass does not clog much and may be packed into barrels ready for use, or it may be completely repulverized by passing it between wooden rolls and thereafter through a revolving screen.

Though a solution of the above strength and applied in the aforementioned proportion will only impregnate the slag with an amount of hydrated sodium carbonate equivalent to about one-half per cent. of $Na_2CO_3$, I have found that dose in some cases very efficient, inasmuch as the admixture of seventeen per cent. of superficially-desulfurized slag dosed in that proportion had the effect of raising the tensile strength of a good Portland cement nearly one hundred pounds per square inch at a seven-day test. I prefer, however, on account of greater economy to carry out both treatments—desulfurizing and alkalizing—in one continuous operation. In order to do this, I alkalize the superficially-desulfurized slag while it is still in the leaching-vats and after it has been reduced to a semidry state by drawing off all of the liquor. The semi-dry slag is of course a much weaker absorbent than that which is completely dry. Hence in order to impregnate it with as large a proportion of alkali as the other the solution has to be made correspondingly stronger. If the semidry slag can, for instance, only absorb about ten per cent. of solution without becoming dripping wet, then the strength of the solution should be doubled, considering that the dried slag can hold in suspension about twenty per cent. After the solution has been added to the charge the further manipulations are the same as already described in the treatment of a dried charge. The most suitable proportion of the alkaline dose is apt to vary, according to the nature of the slag that is to be alkalized, between one-half and one and one-half per cent. of $Na_2CO_3$ or its equivalent of commercial soda and has to be determined in practice.

I may also use bicarbonate of soda and other alkalies. The choice of such equivalents is, however, not only a question of convenience and relative cost, but also one of efficiency, inasmuch as hygroscopic alkalies are not suitable for impregnation.

In defining my invention with greater clearness I would state that I am aware that it has been proposed to add lime and alkalies in a dry state to the dried and granulated slag. This is objectionable for the reasons hereinbefore set forth, and I make no claim to it, but only to the use of the alkalies in solution, which not only give a definite and uniform proportion of the alkali in intimate and homogeneous admixture, but which step is also correlated to the first step of desulfurizing by nitric acid, it being possible to dry out the solution of alkalies from a desulfurized slag in a convenient and practical manner, while sulfurous slag could not be so dried.

Having thus described my invention, I claim as new and desire to secure by Letters Patent—

1. The herein-described process of superficially desulfurizing pulverized blast-furnace slag by the application of a weak solution of nitric acid, and in alkalizing the superficially-desulfurized slag by impregnating it with an alkaline solution, substantially as described.

2. The herein-described process of superficially desulfurizing pulverized blast-furnace slag, by the application of a weak solution of nitric acid, and in alkalizing the superficially-desulfurized slag by impregnating it with an aqueous solution of sodium carbonate substantially as described.

3. An improved product consisting of superficially-desulfurized blast-furnace slag impregnated with alkalies, substantially as herein set forth.

ALEXANDER DANIEL ELBERS.

Witnesses:
EVERARD BOLTON MARSHALL,
J. FRED. ACKER.